315-169.4 SR
XR RE 28,338 103N
X1056T
SEARCH ROOM

Feb. 11, 1975 G. E. HOLZ Re. 28,338

CIRCUIT FOR OPERATING MULTIPLE POSITION DISPLAY TUBES

Original Filed Nov. 5, 1970 2 Sheets-Sheet 1

RE28338

CIRCUIT FOR OPERATING MULTIPLE POSITION DISPLAY TUBES

Original Filed Nov. 5, 1970 2 Sheets-Sheet 2

United States Patent

Re. 28,338
Reissued Feb. 11, 1975

28,338

CIRCUIT FOR OPERATING MULTIPLE POSITION DISPLAY TUBES

George E. Holz, North Plainfield, N.J., assignor to Burroughs Corporation, Detroit, Mich.

Original No. 3,694,693, dated Sept. 26, 1972, Ser. No. 87,058, Nov. 5, 1970. Application for reissue Mar. 7, 1973, Ser. No. 338,887
Int. Cl. H05b *37/00*
U.S. Cl. 315—167 11 Claims

Matter enclosed in heavy brackets [ ] appears in the original patent but forms no part of this reissue specification; matter printed in italics indicates the additions made by reissue.

ABSTRACT OF THE DISCLOSURE

The circuit of the invention is adapted for operation with a display device which includes a plurality of side-by-side groups of display cathode segments, each group having an anode electrode, and there being an auxiliary electrode common to all of the groups of electrodes for electrically isolating each group of display segments and preventing spurious glow between groups. In the circuit, means are provided for providing current flow to the auxiliary electrode in proportion to the total number of display cathode segments glowing at any instant.

BACKGROUND OF THE INVENTION

The present invention relates to display devices known as multiple character or segment devices which include a plurality of groups of cathode electrodes in the form of bars or segments which can be combined in different arrangements to represent different characters. The devices are operated in such a way that a plurality of characters appear to glow at one time. In one form of device described and claimed in copending application of Harvey and Levine, Ser. No. 78,045 filed Oct. 5, 1970, (now abandoned) and in their continuation application Ser. No. 217,781, filed Jan. 14, 1972, each group of electrodes includes a plurality of cathode segments and an anode electrode, and, in addition, an auxiliary electrode common to all of the groups of electrodes is provided for preventing spurious glow from developing between groups. The prior art provides no teaching of such a device or of circuits for operating such a device.

SUMMARY OF THE INVENTION

Briefly, in operating a display device having a plurality of groups of cathode electrodes, an anode for each group, and an auxiliary control electrode, the invention comprises providing a control arrangement for permitting current to flow in the auxiliary electrode in proportion to the total cathode current flowing at any instant, this current biasing the auxiliary electrode at such a potential that spurious glow between groups of electrodes is prevented.

DESCRIPTION OF THE PREFERRED EMBODIMENTS

Figure 1:
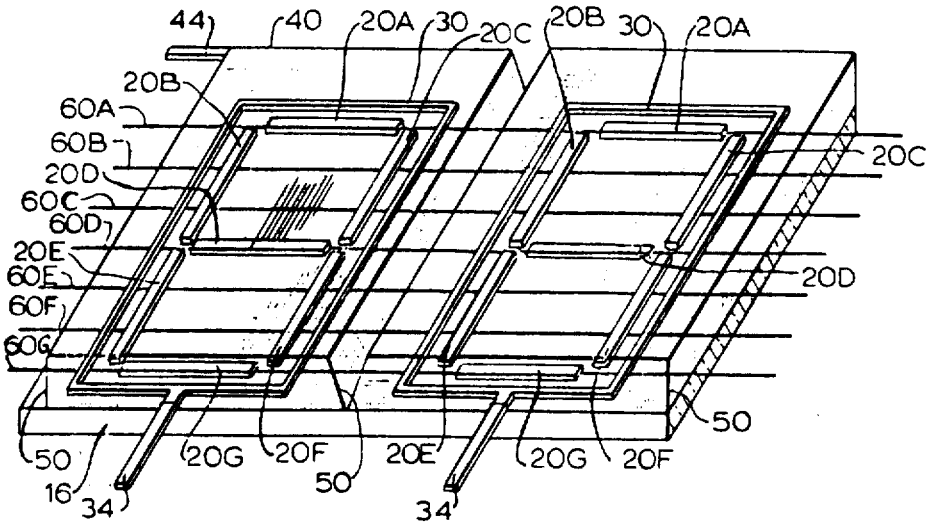
FIG. 1 is a perspective view of a portion of a display device with which the circuit of the invention can be used.
Figure 2:
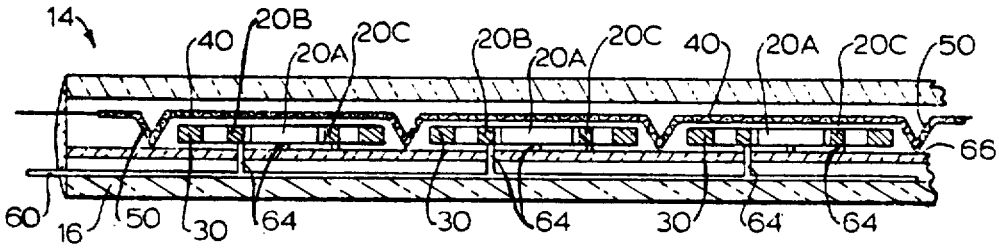
FIG. 2 is a sectional view of the device of FIG. 1.

The principles of the invention are particularly applicable to the type of display device described and claimed in the above-mentioned application, and reference is made to that application for a detailed description of the device. Only portions of such a display device 10 are shown schematically in the drawings. The device 10 includes a gas-filled envelope having a base plate 16 and a face plate 18 (FIG. 2). The envelope contains a plurality of groups of cathode segments 20 (A, B, C, D, E, F, G) and an anode electrode for each group. In this type of device, the cathodes are segments or bars arrayed in the form of a figure "8," as is well known in the art. Additional segments could also be included, as could decimal points and commas or the like. For purposes of illustration, the anode electrode 30 for each group of cathodes is shown as a metal ring surrounding each cathode group, however, if may take any other shape. The anodes have leads 34. In addition, the display device 10 includes an auxiliary electrode 40 in the form of a screen which covers all of the groups of cathodes and anodes and includes walls 50 which extend downwardly between each group of electrodes. The screen 40 has a lead 44.

In actual construction, a common connector electrode 60 (A, B, C, D, E, F, G) is provided for each corresponding cathode in each group of segments so that connector 60A is coupled to all cathodes 20A, connector 60B is coupled to all cathodes 20B, etc. The cathodes are secured to their connectors by means of short tabs 64, and the connectors are suitably supported on base plate 16. An insulating mica plate 66 (FIG. 2) is provided positioned between the segments 20 themselves and their connectors 60 so that, if a conductor glows when its cathodes glow, this spurious glow is not seen.

Figure 3:
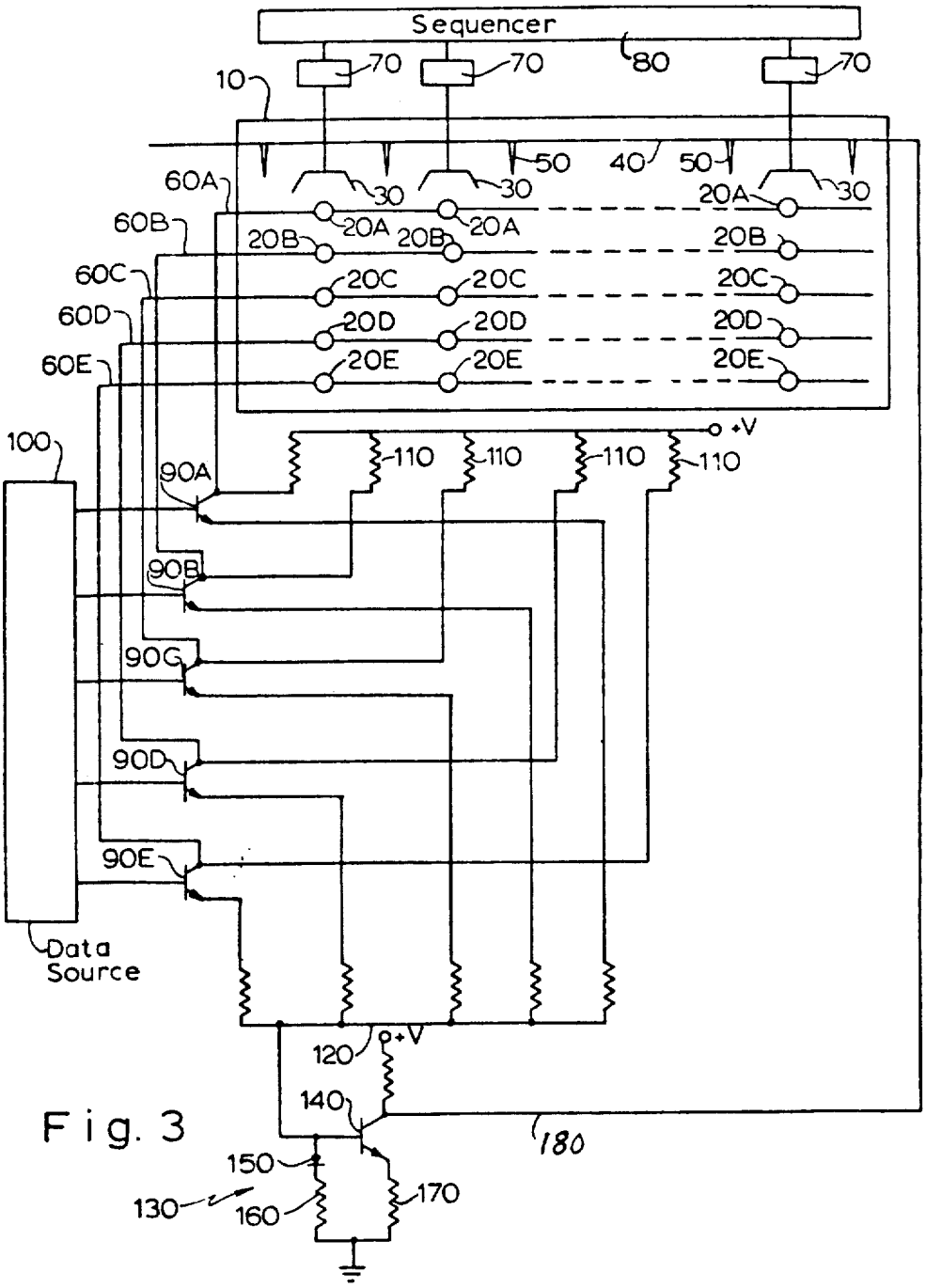
FIG. 3 is a schematic representation of the device of FIG. 1 and the circuit of the invention.

Referring to FIG. 3, display device 10 and its electrodes are shown schematically with its electrodes also shown schematically, in order to simplify the drawing and the description of the circuit. In addition, only five cathodes 20 are shown. The operating circuit includes a separate driver 70 for each anode 30, the drivers being adapted to apply a suitable positive potential to each anode in turn through a suitable sequencing circuit 80. A separate driver is also provided for each cathode, and each driver includes an NPN transistor 90 (A to G) having its base or input electrode connected to a suitable source 100 of electrical information signals. Such source might include a computer and its associated circuit elements. The collector of each cathode driver 90 is connected to its appropriate segment connector 60. In addition, it is customary to provide a prebias voltage for the cathode drivers so that the actual turn-on signals applied are smaller than they might be without such a prebias arrangement. In one suitable arrangement, each collector is connected through a resistor 110 to a bias voltage source.

According to the invention, a circuit 130 is provided including an NPN transistor 140 having its base connected both to the bus 120 and through a diode 150 and resistor 160 to ground. The emitter of the transistor 140 is connected through a resistor 170 to ground, and the collector is connected to a suitable biasing arrangement and to the screen electrode 40, by lead 180.

Briefly, the tube 10 is operated in a mode which is called multiplexing. In this mode of operation, information signals are applied to each of the cathode input terminals from a suitable data source, and, at the same time, each of the anodes has operating potential applied to it, in turn. As each anode is energized, the appropriate information signals are applied to the cathodes so that, at each position, the proper information is displayed. This mode of operation is now well known to those skilled in the art. In the circuit of the invention, as each anode is energized and its corresponding selected cathodes glow, current flows through the cathode driver transistors and through the circuit including transistor 140. This circuit samples the total current flowing through all of the cathodes at each position at any instant and provides a current flow in lead 180 to the screen 40 which is a fraction of and proportional to the total current. This current flow to the screen appears to prevent spurious glow from developing between an energized anode and cathodes in adjacent groups which have operating potential applied to them.

The theory of operation of the invention is that the current to the screen 40 makes the screen cathodic by an amount proportional to the number of cathodes which are glowing, and this action tends to hold the screen at a constant voltage which gives it the proper contact screening action independent of the number of cathodes which are glowing.

The circuit of the invention has the advantage that it is stable and responds well and accurately as the number of cathodes glowing changes from position to position. It is also particularly advantageous in circuits which include high impedance anode drivers such as integrated circuit drivers. In such circuits, there is no readliy obtainable reference potential with respect to which the screen 40 can be driven, and, in this situation, the circuit of the invention would be particularly effective.

What is claimed is:

1. A circuit for operating a display tube comprising a gas-filled envelope containing a plurality of groups of electrodes arrayed in spaced-apart relationship, each group including a plurality of glow cathodes spaced apart in a plane and an associated anode positioned for electric discharge therewith, the cathodes in each group being so arrayed that they can be energized in different combinations to represent different characters and each group having cathodes which correspond in location to the cathodes of said other groups, and an auxiliary electrode common to all of said groups of electrodes and shielding said groups of electrodes from each other, said circuit comprising:

means for applying a first energizing potential to said anode electrodes from a source of operating potential, a common cathode conductor interconnecting the corresponding cathode electrodes of the different groups of cathodes, means for applying a second operating potential to each common cathode conductor, there being a current path from each anode through each cathode and the source of operating potential, and a circuit module coupled to all of said current paths and to the common auxiliary electrode for receiving the total current flowing in each group of cathodes as each is energized, said circuit module including means for conducting a current proportional to said total current and coupling it to said common auxiliary electrode.

2. The circuit defined in claim 1 wherein said means for applying a second operating potential to each common cathode conductor includes a transistor having emitter, base, and collector electrodes, each base electrode being connected to a source of information signals, each collector electrode being connected to one of said common cathode conductors, and each emitter electrode being connected to a bus common to all of said current paths, and said circuit module being coupled to said common bus and to said common auxiliary electrode.

3. The circuit defined in claim 1, wherein said circuit module includes a transistor having emitter, base, and collector electrodes, the base electrode being connected to the means for applying operating potential to each of the cathode conductors, the emitter electrodes being connected to a source of reference potential, and said collector electrode being connected to said auxiliary electrode.

*4. A character display circuit comprising*

*an envelope containing an ionizable gas,*

*an anode and a plurality of cathodes within said envelope, each of said cathodes having the shape of a segment of a character to be displayed,*

*circuit means for establishing a glow potential between said anode and different numbers and combinations of cathodes for causing said different numbers and combinations of cathodes to glow and thereby display different characters,*

*said circuit means including a plurality of cathode drivers, one connected to each of said cathodes, and means for selectively energizing said cathode drivers to render their connected cathodes glowing,*

*second circuit means for generating a voltage signal proportional to the number of said cathodes which are glowing at any particular time,*

*said second circuit means including an impedance element connected electrically in series with all of said cathode drivers, so that the current through each of said cathode drivers passes through said impedance element and develops a voltage thereacross, and*

*terminals connected to said impedance element for delivering said proportional voltage signal.*

*5. A character display circuit as in Claim 4 wherein each of the cathode drivers is a solid state switching device with a signal input terminal and two output terminals, one of which is connected through circuit means to one of said cathodes while the other is connected through further circuit means to a common terminal,*

*each of said solid state switching devices thus being connected from said common terminal to a different cathode, and*

*wherein said impedance element is connected to said common terminal.*

*6. A character display circuit as in Claim 5 wherein the cathode drivers are transistors,*

*wherein the means for selectively energizing said cathode drivers comprises circuit means connected to the base electrodes of the transistors to render them more conductive in response to input signals, and*

*wherein one terminal of each of the transistors is connected to a cathode, while another terminal thereof is connected through a current-limiting impedance to the common terminal.*

*7. A character display circuit as in Claim 4 further including an amplifier device connected to said impedance element to receive the voltage developed across said impedance element and generate an amplified replica thereof.*

*8. A character display circuit as in Claim 4 further including*

*an auxiliary electrode within said envelope in operative relation with at least one of said anode and cathodes, and*

*circuit means connecting said impedance element to said auxiliary electrode to supply said voltage signal to said auxiliary electrode.*

*9. A character display circuit for displaying any one of a plurality of characters in each of a plurality of side-by-side character positions and generating a voltage signal proportional to the number of cathodes glowing at each such position, comprising*

*a plurality of anodes, one in each of said character positions,*

*a plurality of groups of cathodes, each such group being associated with one of said anodes and being located in one of said character positions, each of the cathodes having the shape of a segment of one of the characters to be displayed,*

*each of said anodes and its associated cathodes being disposed in an ionizable gas atmosphere at a pressure capable of sustaining cathode glow,*

*a plurality of cathode conductors each electrically connected to one of the cathodes in each character position,*

*a plurality of cathode drivers, each connected to one of said cathode conductors, for energizing different numbers and combinations of said cathodes in response to different numbers and combinations of electrical signals received by said cathode drivers,*

*circuit means for sequentially energizing said anodes, in synchronism with the selective energization of said cathodes, for displaying selected characters in each of said character positions,*

*second circuit means for generating a series of voltage levels, one for each of the sequentially activated character positions during the time the associated anode is energized, each level being proportional to the number of cathodes energized at the character position,*

*said second circuit means including an impedance element connected electrically in series with all of said cathode drivers, so that the current through each of said cathode drivers passes through said impedance element and develops a voltage thereacross, and*

*terminals connected to said impedance element for delivering said proportional voltage signal.*

*10. A character display circuit as in Claim 9 further including*

*an auxiliary electrode within said gaseous atmosphere in operative relation with at least one of said anodes and cathodes,*

*a bias circuit connected to said auxiliary electrode for establishing thereon a predetermined bias voltage, and*

*circuit means connecting said impedance element to said auxiliary electrode to supply said proportional voltage signal thereto to compensate for any change in the established bias voltage.*

*11. A character display circuit as in Claim 10 wherein the auxiliary electrode contains a portion thereof located between the anode and cathodes in each character position and those of the next adjacent character position, and*

*wherein the bias circuit and the circuit means connecting the impedance element to the auxiliary electrode serve to maintain on the auxiliary electrode a voltage within a predetermined range for isolating the anode and cathodes of each character position from those of all of the other character positions.*

References Cited

The following references, cited by the Examiner, are of record in the patented file of this patent or the original patent.

UNITED STATES PATENTS

| | | | |
|---|---|---|---|
| 3,343,155 | 9/1967 | Pahlavan | 315—169 R |
| 3,400,388 | 9/1968 | Blank | 340—336 X |

HERMAN K. SAALBACH, Acting Primary Examiner

L. J. DAHL, Assistant Examiner

U.S. Cl. X.R.

315—169 T; 340—336